Nov. 7, 1939.    L. C. JOHNSON    2,179,093
TRIMMER CONDENSER BANK
Filed Jan. 13, 1939
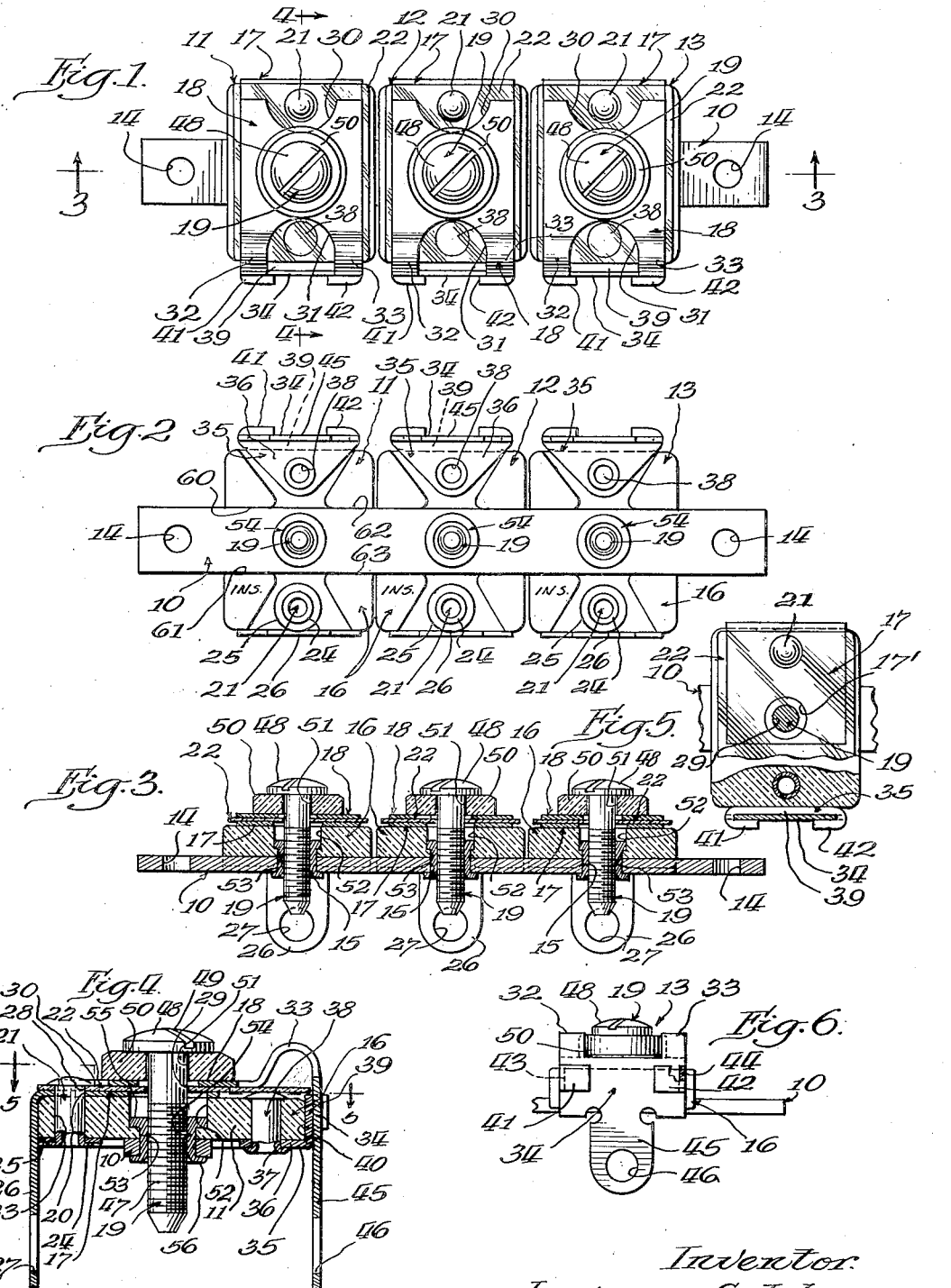
Inventor:
Lawrence C. Johnson Patented Nov. 7, 1939

2,179,093

UNITED STATES PATENT OFFICE 2,179,093

TRIMMER CONDENSER BANK

Lawrence C. Johnson, Park Ridge, Ill., assignor to Underwood Electric & Mfg. Co. Inc., Chicago, Ill., a corporation of Illinois Application January 13, 1939, Serial No. 250,784

6 Claims. (Cl. 175—41.5)

The present invention relates to trimmer condenser banks, and is particularly concerned with improvements in banks of trimmer condensers of the type adapted to be utilized where the elements of the various trimmer condensers must be electrically insulated from each other.

One of the objects of the invention is the provision of an improved trimmer condenser bank so constructed that a plurality of trimmer condensers may be mechanically secured together in a bank by means of a metal element, without the metal element effecting a connection between the various elements of the trimmer condensers.

Another object of the invention is the provision of an improved trimmer condenser bank structure in which the trimmer condensers are adapted to be firmly supported upon a metal bar in such manner that they may be installed or removed as a unit, but all of the elements of the trimmer condenser bank are electrically insulated from each other.

Another object of the invention is the provision of an improved trimmer condenser bank of the type comprising trimmer condensers mounted on porcelain, in which the condensers are adapted to be mounted upon a single metallic bar and secured thereto in such manner that there is no possibility of rotation of the condenser on the bar or of the condenser getting loose or changing its electrical characteristics or adjustment.

Other objects and advantages of the invention will be apparent from the following description and the accompanying drawing, in which similar characters of reference indicate similar parts throughout the several views.

Referring to the single sheet of drawings accompanying this specification,

Fig. 1 is a top plan view of the condenser bank constructed according to the invention;

Fig. 2 is a bottom plan view of the condenser bank;

Fig. 3 is a longitudinal sectional view, taken on the plane of the line 3—3 of Fig. 1, looking in the direction of the arrows;

Fig. 4 is an enlarged transverse sectional view, taken on the plane of the line 4—4 of Fig. 1;

Fig. 5 is a fragmentary sectional view, taken on the plane of the line 5—5 of Fig. 4, looking in the direction of the arrows;

Fig. 6 is a rear elevational view of one of the condensers forming the bank.

The present invention relates to improvements in trimmer condensers of the type shown and covered by my Patent No. 2,067,238, issued January 12, 1937.

The trimmer condensers of which the bank is composed may consist of various different types of construction in so far as the area and shape of the condenser plates is concerned, but all of the condensers have certain features in common. For example, the condenser bank may consist of a metallic strip 10 which supports a multiplicity of trimmer condensers 11, 12 and 13, three being selected merely for the purpose of illustration, since the bank may consist of any number of condensers.

The metal strip 10 may consist of a rectangular strip of galvanized steel, which is provided at each end with a through aperture 14, which may be utilized for the purpose of securing the condenser in place upon the framework of the equipment with which it is used. The metal strip 10 also has a plurality of apertures 15, preferably regularly spaced for the purpose of utilization in the support of the various trimmer condensers of the bank.

Each trimmer condenser may be substantially as shown in Fig. 4, and may comprise a porcelain insulating block 16 adapted to support a pair of condenser plates 17 and 18. The condenser plate 17 comprises a metal plate which may be of the shape of the plate 17 of Fig. 5, that is, substantially rectangular in form, but provided with an enlarged aperture 17' surrounding the central screw bolt 19.

The body of the plate 17 also has an aperture 20 for receiving the rivet 21, which passes through the mica insulating sheet 22 and through the plate 17, and an aperture 23 in the porcelain block 16.

The rivet 21 is riveted over at 24 at the bottom of the condenser, and includes a metal washer 25, whereby the effective size of the riveted formation is increased. The plate 17 also has a downwardly extending connector member 26, which may be provided with an aperture 27 for use in securing conductors to the connector 26 and plate 17.

The mica sheet 22 is for the purpose of insulating the plates 17 and 18 from each other, and it may comprise a rectangular sheet of mica having the aperture 28 for passing the rivet 21 and having another aperture 29 for passing the screw bolt 19.

The mica sheet 22 completely covers the plate 17, as well as various other parts of the porcelain block 16, and insulates the plates 17 and 18 from each other. The condenser plate 18 may also have a substantially rectangular shape in plan, as shown in Fig. 1; but it is preferably provided with a semi-circular slot 30 at the top for providing a clearance between the plate and the head of the rivet, and with a similar semi-circular slot 31 at its rear side for the purpose of forming a pair of resilient U-shaped pintle arms 32, 33 (Fig. 1 and Fig. 4).

The pintle arms 32, 33 are integrally joined to substantially flat, downwardly extending body 34, which is secured to the porcelain block 16 by means of a sheet metal angle bracket 35. The sheet metal angle bracket 35 comprises a flat attachment flange 36, having an aperture 37 for passing the shank of the rivet 38.

The rivet 38 has its head at the top of the porcelain block 11, and is riveted over below the attachment flange 36, so that the bracket is firmly bound to the porcelain block by the rivet 38.

The bracket 35 has an upwardly extending flange 39, which is at right angles to the flange 36 and so located that the flange 39 engages flatly against the plane edge surface 40 of the porcelain block 16. Thus a single rivet 38 may be utilized to secure this bracket against rotation or other movement on the porcelain block 16.

The vertical body flange 39 is provided with a pair of confining ears 41, 42, which are located in grooves 43, 44 in the edges of the body flange 34, and are bent back as shown in Fig. 5, in U shape, to clamp the body flange 34.

Like the other condenser plate 17, the condenser plate 18 has a depending connector flange 45, which is provided with an aperture 46 for connection to conductors.

The upper condenser plate 18 is normally resiliently urged away from the lower condenser plate by means of the pintles 32, 33, and the condensers are provided with metal screw bolts 19 for urging the condenser plates toward each other and for effecting an adjustment of the capacity of the condenser. Each of the screw bolts 19 has a threaded shank 47 and a head 48 provided with a slot 49. Each of the condenser plates has a clearance with the shank 47, and the head 48 is insulated from the upper condenser plate 18 by the interposition of a porcelain washer 50.

The porcelain washer 50 comprises a substantially disc-like porcelain member, having a centrally located aperture 51 for passing the shank 47. The porcelain blocks 16 are each provided with a hexagonal bore 52 and communicate with a cylindrical counterbore 53.

The counterbore 53 is adapted to receive an internally threaded tubular member 54, the upper end of which is outwardly flanged at 55 in the bore 52. The hexagonal formation of the flange 55 in the hexagonal bore 52 prevents rotation of the threaded sleeve 54.

The threaded tubular member 54 has threads which fit the threads on the shank 47 on the screw bolts 19, and the lower end of the tubular member 54 is riveted over at 56 below the metal strip 10, the tubular member 54 passing through one of the apertures 15.

By this structure the porcelain blocks 16, on which the condensers are supported, are all fixedly secured to the metal strip 10, but they are still insulated from each other in respect to all of the condenser plates. The condenser plates may be separately utilized in different circuits without any possibility of intercommunication of the circuits.

The porcelain supporting blocks are preferably formed with oppositely disposed flat shoulders 60—63, arranged on the opposite sides of the metal strip 10, and prevent any rotative movement of the porcelain blocks on the metal strip. Thus the single tubular securing member 54 is adapted to effect a fixed securement of each condenser on the metal bar 10.

It will thus be observed that I have invented an improved condenser bank which may utilize the condensers of my prior patent, and by means of which the various condensers may be secured together on a metallic mounting to be installed or removed as a unit in various electrical apparatus.

The same tubular rivet which is utilized to receive the threaded member that effects an adjustment of the condenser is also utilized to effect a securement of the condenser to a condenser bank unit.

The condensers are all insulated from each other and are a unit only in so far as mechanical support is concerned.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a trimmer condenser assembly, the combination of a metal supporting bar provided with a plurality of apertures and a plurality of trimmer condensers, each trimmer condenser comprising an insulating supporting member, a centrally located threaded member, a pair of condenser plates carried by said insulating member, and threaded means engaging in said threaded member and adapted to draw said plates together, said threaded member being fixedly secured to said metal bar for the purpose of supporting said trimmer condensers in a bank, said threaded member comprising a metal sleeve having a shoulder for engaging a shoulder in said insulating member and having its opposite end spun outwardly into engagement with the metal bar.

2. In a trimmer condenser assembly, the combination of a metal supporting bar provided with a plurality of apertures and a plurality of trimmer condensers, each trimmer condenser comprising an insulating supporting member, a centrally located threaded member, a pair of condenser plates carried by said insulating member, and threaded means engaging in said threaded member and adapted to draw said plates together, said threaded member being fixedly secured to said metal bar for the purpose of supporting said trimmer condensers in a bank, said threaded member comprising a metal sleeve having a shoulder for engaging a shoulder in said insulating member and having its opposite end spun outwardly into engagement with the metal bar, and said threaded means comprising a screw bolt having a clearance with respect to said condenser plates and having an insulating member engaged by the head of said screw bolt and engaging the uppermost of said condenser plates.

3. In a trimmer condenser assembly, the combination of a metal supporting bar provided with a plurality of apertures and a plurality of trimmer condensers, each trimmer condenser comprising an insulating supporting member, a centrally located threaded member, a pair of condenser plates carried by said insulating member, and threaded means engaging in said threaded member and adapted to draw said plates together, said threaded member being fixedly secured to said metal bar for the purpose of supporting said trimmer condensers in a bank, said threaded means comprising a screw bolt having a clearance with respect to said condenser plates and having an insulating member engaged by the head of said screw bolt and engaging the uppermost of said condenser plates.

4. In a trimmer condenser bank, the combination of a metal bar having flat edge surfaces and a flat top surface, with a plurality of insulating members, said insulating members being provided with flat lower surfaces for engaging the top surface of said bar, and with opposed shoulders engaging the opposite flat edges of said bar, said insulating members each supporting a pair of condenser plates, and an insulating sheet between said plates, and a threaded sleeve having a shoulder engaging each of said insulating members and passing through said metal bar, and having an opposite shoulder engaging below said metal bar, said threaded sleeve having a threaded member therein, provided with a head for drawing said condenser plates toward each other.

5. In a trimmer condenser bank, the combination of a metal bar having flat edge surfaces and a flat top surface, with a plurality of insulating members, said insulating members being provided with flat lower surfaces for engaging the top surface of said bar, and with opposed shoulders engaging the opposite flat edges of said bar, said insulating members each supporting a pair of condenser plates, and an insulating sheet between said plates, and a threaded sleeve having a shoulder engaging each of said insulating members and passing through said metal bar, and having an opposite shoulder engaging below said metal bar, said threaded sleeve having a threaded member therein, provided with a head for drawing said condenser plates toward each other, said threaded member having an insulating washer disposed between said head and said condenser plates.

6. In a trimmer condenser assembly, the combination of a metal supporting bar provided with a plurality of apertures and a plurality of trimmer condensers, each trimmer condenser comprising an insulating supporting member, a centrally located threaded member, a pair of condenser plates carried by said insulating member, and threaded means engaging in said threaded member and adapted to draw said plates together, said threaded member being fixedly secured to said metal bar for the purpose of supporting said trimmer condensers in a bank, said insulating supporting members each having opposed shoulders engaging the edges of said metal bar.

LAWRENCE C. JOHNSON.